(12) United States Patent
Yoshimoto et al.

(10) Patent No.: US 12,385,229 B2
(45) Date of Patent: Aug. 12, 2025

(54) METHOD FOR GENERATING EXCAVATION TRAJECTORY, SYSTEM, AND EXCAVATION TRAJECTORY GENERATION APPARATUS

(71) Applicant: NEC Corporation, Tokyo (JP)

(72) Inventors: Tatsuya Yoshimoto, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 443 days.

(21) Appl. No.: 17/624,923

(22) PCT Filed: Jul. 17, 2019

(86) PCT No.: PCT/JP2019/028107
§ 371 (c)(1),
(2) Date: Jan. 5, 2022

(87) PCT Pub. No.: WO2021/009873
PCT Pub. Date: Jan. 21, 2021

(65) Prior Publication Data
US 2022/0275606 A1  Sep. 1, 2022

(51) Int. Cl.
*G05D 1/00* (2024.01)
*E02F 9/26* (2006.01)

(52) U.S. Cl.
CPC .......... *E02F 9/262* (2013.01); *G05D 1/0212* (2013.01)

(58) Field of Classification Search
CPC . E02F 9/262; E02F 9/205; E02F 3/437; E02F 3/43; E02F 9/2087; E02F 9/265; G05D 1/0212
See application file for complete search history.

(56) References Cited

U.S. PATENT DOCUMENTS

| 6,108,949 A | 8/2000 | Singh et al. |
| 10,761,537 B1 * | 9/2020 | Ready-Campbell ........................ G05D 1/0212 |
| 2015/0046044 A1 | 2/2015 | Martinsson et al. |
| 2016/0258128 A1 | 9/2016 | Nakamura et al. |

(Continued)

FOREIGN PATENT DOCUMENTS

| JP | S63-194032 A | 8/1988 |
| JP | H06-298374 A | 10/1994 |

(Continued)

OTHER PUBLICATIONS

International Search Report for PCT Application No., PCT/JP2019/028107, mailed on Sep. 10, 2019.

*Primary Examiner* — Bao Long T Nguyen

(74) *Attorney, Agent, or Firm* — Sughrue Mion, PLLC

(57) ABSTRACT

In order to generate a trajectory that enables efficient excavation of an object, an excavation trajectory generation apparatus 4 includes: an excavation point obtaining section 110 configured to obtain information related to an excavation point at which an object 2 is to be excavated; a parameter calculation section 120 configured to calculate a parameter to be used for generating an excavation trajectory; and an excavation trajectory generation section 140 configured to generate a trajectory with which an excavator 3 excavates the object 2, based on the excavation point, accumulation height information for the object 2 at the excavation point, and an excavation possible range for the excavator 3 to excavate the object 2.

14 Claims, 16 Drawing Sheets

(56) References Cited

U.S. PATENT DOCUMENTS

| | | | |
|---|---|---|---|
| 2016/0258129 A1 | 9/2016 | Wei et al. | |
| 2018/0002899 A1* | 1/2018 | Morimoto | E02F 3/43 |
| 2020/0240118 A1* | 7/2020 | Cheng | G06T 7/593 |

FOREIGN PATENT DOCUMENTS

| | | |
|---|---|---|
| JP | H11-247230 A | 9/1999 |
| JP | 2013-002058 A | 1/2013 |
| JP | 2016-089559 A | 5/2016 |
| JP | 2016-160718 A | 9/2016 |
| WO | 2017/159744 A1 | 9/2017 |

* cited by examiner

Algorithm 1 Calculate $DRAG$ and $GRAD_{avg}$

Require: $DRAG_{min} \leq DRAG \leq DRAG_{avg}$, $DRAG_{max} = DRAG_{base}$
Ensure: $DRAG, GRAD_{avg}$
$DRAG \Leftarrow DRAG_{min}$
while
do
    calculate $GRAD_{avg}(DRAG)$
    calculate $VOL(DRAG, GRAD_{avg})$
    if $VOL < VOL_{th}$ then
        $DRAG \Leftarrow DRAG + \Delta DRAG$
        if $DRAG > DRAG_{max}$ then
            break
        end if
    else
        break
    end if
end while

Fig. 8

METHOD FOR GENERATING EXCAVATION TRAJECTORY, SYSTEM, AND EXCAVATION TRAJECTORY GENERATION APPARATUS

This application is a National Stage Entry of PCT/JP2019/028107 filed on Jul. 17, 2019, the contents of all of which are incorporated herein by reference, in their entirety.

BACKGROUND

Technical Field

The present invention relates to a method for generating an excavation trajectory, a system, and an excavation trajectory generation apparatus that are for generating a trajectory with which an excavator excavates an object.

Background Art

From the viewpoints of cost reduction owing to reduction in the number of operators, safety improvement owing to unattended operation, and the like, an effort is underway to automatize operation using an excavator, such as a backhoe, for carrying out soil.

To automatically control such an excavator, for example, PTL 1 discloses, as a method for generating a trajectory of an excavator, a trajectory generation apparatus that determines an excavation start point and generates a trajectory resulting in little load on a bucket, that is, a trajectory for the bucket not to be overloaded.

PTL 2 discloses a method for planning earth-working operation. In the method, individual excavation sites are investigated in the order of excavation, and a cost function is optimized based on performance criteria such as an excavation volume, energy consumption, and time, to thereby determine the position and the direction of a bucket of excavation equipment.

CITATION LIST

Patent Literature

[PTL 1] JP 2016-160718 A
[PTL 2] JP 11-247230 A

SUMMARY

Technical Problem

PTLs 1 and 2 described above and the like disclose generating an excavation trajectory. However, it is desired to generate a trajectory that enables efficient excavation in consideration of an accumulation state of an excavation object, such as an accumulation volume and the shape of the object, for example.

An example object of the present invention is to provide a method for generating a trajectory, a system, and an excavation trajectory generation apparatus that can generate a trajectory that enables efficient excavation of an object.

Solution to Problem

A method for generating an excavation trajectory of the present invention includes: obtaining information related to an excavation point at which an object is to be excavated; and generating a trajectory with which an excavator excavates the object, based on the excavation point, accumulation height information for the object at the excavation point, and an excavation possible range for the excavator to excavate the object.

A system of the present invention includes: an excavator configured to excavate an object; and an excavation trajectory generation apparatus configured to generate a trajectory with which the excavator excavates the object, wherein the excavation trajectory generation apparatus includes an obtaining section configured to obtain information related to an excavation point at which the object is to be excavated, a generation section configured to generate a trajectory with which the excavator excavates the object, based on the excavation point, accumulation height information for the object at the excavation point, and an excavation possible range for the excavator, and a control section configured to indicate, to the excavator, that the excavator excavates the object along the trajectory, and the excavator is configured to excavate the object along the trajectory.

An excavation trajectory generation apparatus of the present invention includes: an obtaining section configured to obtain information related to an excavation point at which an object is to be excavated; and a generation section configured to generate a trajectory with which an excavator excavates the object, based on the excavation point, accumulation height information for the object at the excavation point, and an excavation possible range for the excavator to excavate the object.

Advantageous Effects of Invention

According to the present invention, it is possible to generate a trajectory that enables efficient excavation of an object. Note that, according to the present invention, instead of or together with the above effects, other effects may be exerted.

BRIEF DESCRIPTION OF THE DRAWINGS

FIG. 8 is a diagram illustrating a calculation algorithm for calculating DRAG and GRADavg;

DESCRIPTION OF THE EXAMPLE EMBODIMENTS

Figure 1:
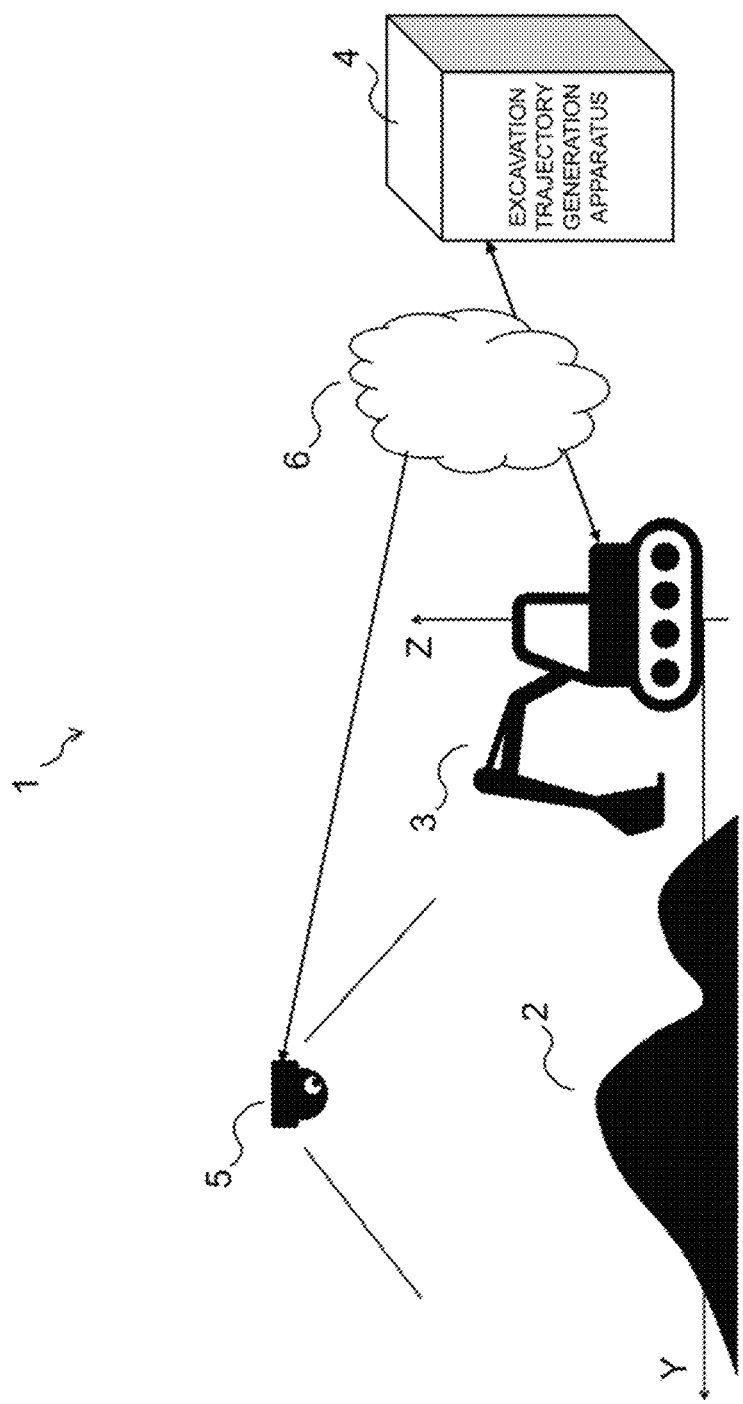
FIG. 1 is an explanatory diagram illustrating an example of a schematic configuration of a system according to an example embodiment of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of the Present Invention
2. Configuration of System
3. First Example Embodiment
   3.1. Configuration of Excavation Trajectory Generation Apparatus 4
   3.2. Technical Features
4. Second Example Embodiment
   4.1. Configuration of Excavation Trajectory Generation Apparatus 4
   4.2. Technical Features
5. Other Example Embodiments 1. Overview of Example Embodiments of the Present Invention First, an overview of example embodiments of the present invention will be described.

(1) Technical Issues

From the viewpoints of cost reduction owing to reduction in the number of operators, safety improvement owing to unattended operation, and the like, an effort is underway to automatize operation using an excavator, such as a backhoe, for carrying out soil.

Automation of an excavator is enabled, for example, by performing recognition processing, determination processing, control processing, and the like as those described below. First, recognition processing is performed to observe states of an excavator (backhoe) and environment (such as a soil pit and a dump) through a sensor network and to collect, in an automatic control system, observation information obtained from the observation. Subsequently, determination processing is performed to determine an excavation position, an excavation volume, a trajectory, and the like. Subsequently, control processing is performed to control the excavator, based on the trajectory thus determined.

For such automation, it is desired to generate a trajectory that enables efficient excavation in consideration of an accumulation state of an excavation object, such as an accumulation volume and the shape of the object, for example. In view of this, an example object of the present example embodiment is to generate a trajectory that enables efficient excavation of an object.

(2) Technical Features

An example embodiment of the preset invention includes, for example: obtaining information related to an excavation point at which an object is to be excavated; and generating a trajectory with which an excavator excavates the object, based on the excavation point, accumulation height information for the object at the excavation point, and an excavation possible range for the excavator to excavate the object.

Through these operations, it is possible, for example, to generate a trajectory that enables efficient excavation of an object. Note that the above-described technical features are concrete examples of the example embodiments of the present invention, and the example embodiments are, of course, not limited to the above-described technical features.

2. CONFIGURATION OF SYSTEM

With reference to FIG. 1, an example of a configuration of a system 1 according to example embodiments of the present invention will be described. FIG. 1 is an explanatory diagram illustrating an example of a schematic configuration of the system 1 according to the example embodiments of the present invention. With reference to FIG. 1, the system 1 includes: an excavator 3 that excavates an object 2 such as soil accumulated in a soil pit, for example; an excavation trajectory generation apparatus 4 that generates a trajectory with which the excavator 3 excavates the object 2; and a position detection apparatus 5 that detects a position of the object 2.

In the system 1 having such a configuration described above, for example, the excavation trajectory generation apparatus 4 is disposed at a location remote from the excavator 3 and communicates with the excavator 3 through a network 6. In this way, the excavation trajectory generation apparatus 4 can remotely control the excavator 3. For example, the excavation trajectory generation apparatus 4 may be communicable with the position detection apparatus 5 through the network 6. The network 6 is a wired network (e.g., a local area network (LAN), an optical fiber, or the like) or wireless network (e.g., Long Term Evolution (LTE), WiFi (registered trademark), or local 5G).

The position detection apparatus 5 detects information related to the object 2 at an excavation site and transmits information related to a detection result, to the excavation trajectory generation apparatus 4 through the network 6, for example. The position detection apparatus 5 is, for example, a 3D LiDAR, a stereo camera, or a three-dimensional sensor (3D sensor) such as a time of flight (TOF) camera, but is not limited thereto. In a case that the position detection apparatus 5 is the 3D LiDAR, obtained information may be, as an example, three-dimensional coordinate information of the object 2. In a case that the position detection apparatus 5 is the stereo camera, obtained information may be, as an example, a captured three-dimensional image of the object 2. Note that obtained information of the object 2 is not limited to these two examples.

In the present example embodiment, description is given, as a concrete example of the excavator 3, of a backhoe with an operating surface of a shovel (bucket) being on a near side, the shovel (bucket) being attached to a tip end of an arm. Note that the excavator 3 is not limited to a backhoe and may be, for example, a power shovel with an operating surface of a shovel (bucket) facing forward, for example.

3. First Example Embodiment

Next, with reference to FIGS. 2 to 15, an excavation trajectory generation apparatus 4 according to a first example embodiment will be described.

<3.1. Configuration of Excavation Trajectory Generation Apparatus 4>

Figure 2:
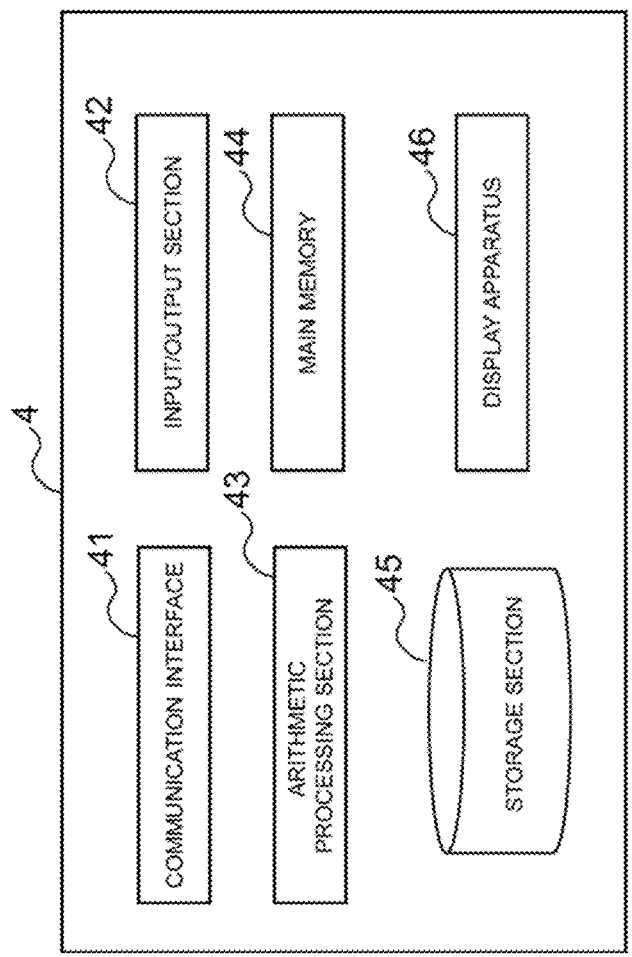
FIG. 2 is a block diagram illustrating an example of a hardware configuration of an excavation trajectory generation apparatus 4 according to a first example embodiment.

FIG. 2 is a block diagram illustrating an example of a hardware configuration of the excavation trajectory generation apparatus 4 according to the first example embodiment. With reference to FIG. 2, the excavation trajectory generation apparatus 4 includes a communication interface 41, an input/output section 42, an arithmetic processing section 43, a main memory 44, and a storage section 45.

The communication interface 41 transmits and/or receives data with an external apparatus. For example, the communication interface 41 communicates with the external apparatus via a wired channel or a wireless channel.

The arithmetic processing section 43 is, for example, a central processing unit (CPU), a graphics processing unit (GPU), or the like. The main memory 44 is, for example, a random access memory (RAM), a read only memory (ROM), or the like. The storage section 45 is, for example, a hard disk drive (HDD), a solid state drive (SSD), a memory card, or the like. The storage section 45 may be a memory such as a RAM or a ROM.

Figure 3:
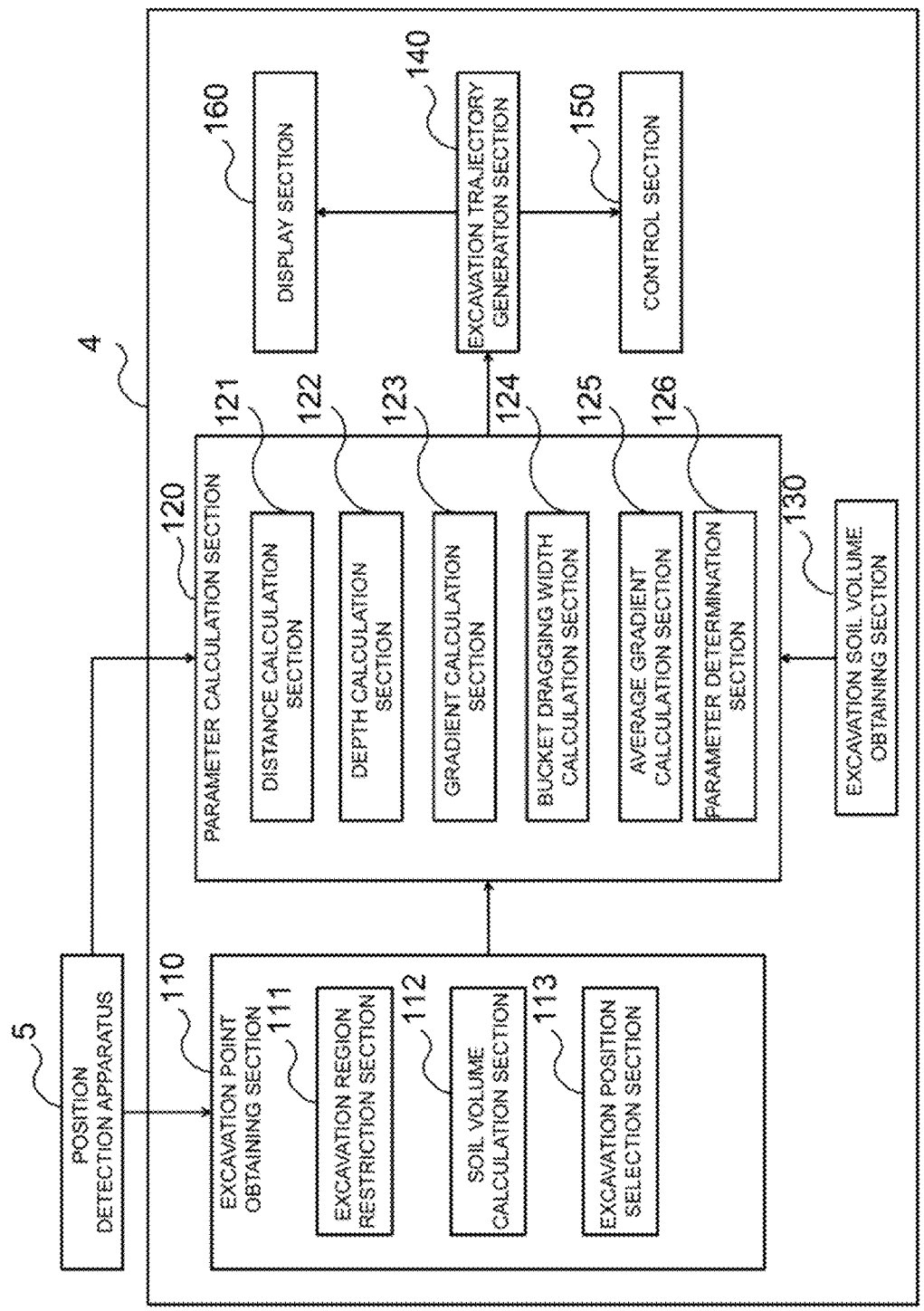
FIG. 3 is a block diagram illustrating an example of a configuration implemented by the excavation trajectory generation apparatus 4 and a position detection apparatus 5 in a system 1 according to the first example embodiment.

In the excavation trajectory generation apparatus 4, for example, programs for excavation trajectory generation stored in the storage section 45 are read out to the main memory 44, and the arithmetic processing section 43 executes the programs, to thereby implement function sections as those illustrated in FIG. 3. These programs may be read out first to the main memory 44 and then executed, or may be executed without being read out to the main memory 44. The main memory 44 and the storage section 45 also function to store information and data held by constituent elements included in the excavation trajectory generation apparatus 4.

The above-described programs can be stored in various types of non-transitory computer readable media, to be provided to a computer. The non-transitory computer readable media include various types of tangible storage media. Examples of the non-transitory computer readable media include a magnetic recording media (e.g., a flexible disk, a magnetic tape, and a hard disk drive), a magneto-optical recording media (e.g., a magneto-optical disk), a compact disk-ROM (CD-ROM), a CD-recordable (CD-R), a CD-rewritable (CD-R/W), a semiconductor memory (e.g., a mask ROM, a programmable ROM (PROM)), an erasable PROM (EPROM), a flash ROM, and a RAM. The programs may be provided to the computer by way of various types of transitory computer readable media. Examples of the transitory computer readable media include an electric signal, an optical signal, and an electromagnetic wave. Such a transitory computer readable medium can provide the programs to the computer through a wired channel such as an electric wire or an optical fiber, or a wireless channel.

The display apparatus 46 is an apparatus, such as a liquid crystal display (LCD), a cathode ray tube (CRT) display, or a monitor, that displays a screen corresponding to rendering data processed by the arithmetic processing section 43.

FIG. 3 is a block diagram illustrating an example of a configuration implemented by the excavation trajectory generation apparatus 4 and the position detection apparatus 5 in the system 1 according to the first example embodiment. With reference to FIG. 3, the excavation trajectory generation apparatus 4 includes an excavation point obtaining section 110, a parameter calculation section 120, an excavation soil volume obtaining section 130, an excavation trajectory generation section 140, a control section 150, and a display section 160.

<3.2. Technical Features>

Next, with reference to FIGS. 2 to 15, technical features of the first example embodiment will be described.

According to the first example embodiment, the excavation trajectory generation apparatus 4 (the excavation point obtaining section 110) obtains information related to an excavation point at which the object 2 is to be excavated. Then, the excavation trajectory generation apparatus 4 (the excavation trajectory generation section 140) generates a trajectory with which the excavator 3 excavates the object 2. The excavation trajectory generation apparatus 4, for example, generates the trajectory with which the excavator 3 excavates the object 2, based on the excavation point, accumulation height information for the object 2 at the excavation point, and an excavation possible range for the excavator 3 to excavate the object 2.

Here, the accumulation height information for the object 2 at the excavation point is, for example, information expressed by the depth of the object from the excavation point to a grounding surface of the excavator. The excavation possible range for the excavator 3 is determined, for example, by a dragging width of a bucket included in the excavator 3 (also referred to as a bucket dragging width, below). The depth of the object 2, the bucket dragging width of the excavator 3, and the like are calculated by the parameter calculation section 120, for example.

(1) Obtaining of Excavation Point

Concretely, to obtain the information related to the excavation point, the excavation point obtaining section 110 includes an excavation region restriction section 111, a soil volume calculation section 112, and an excavation position selection section 113, as illustrated in FIG. 3.

Narrowing Down of Excavation Possible Region

The excavation point obtaining section 110 (the excavation region restriction section 111) specifies a range in which the excavator 3 can excavate. The excavation region restriction section 111, for example, calculates the distance from a body part of the excavator 3 to the excavation point and identifies a region in which the excavation is possible, based on the distance from the body part of the excavator 3 to the excavation point.

Figure 4:
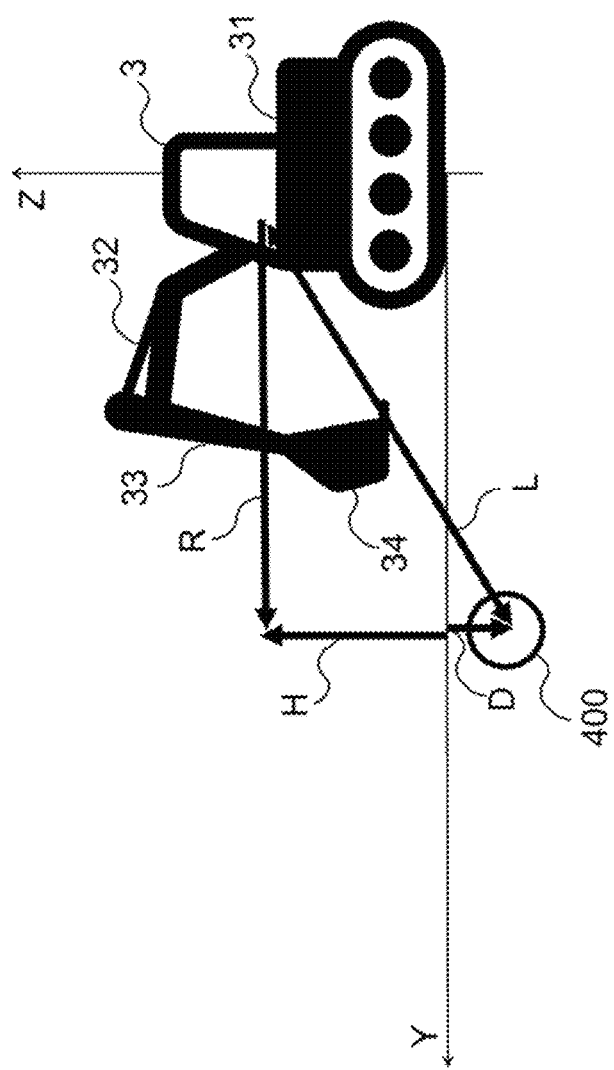
FIG. 4 is an explanatory diagram for describing an example of processing for calculating an excavation point from a body part of an excavator 3.

FIG. 4 is an explanatory diagram for describing an example of processing for calculating a target point 400 from a body part 31 of the excavator 3. With reference to FIG. 4, the excavator 3 includes the body part 31, a boom 32, an arm 33, and a bucket 34.

R denotes the horizontal distance from the position of the body part 31 (e.g., the pivot of the body part 31) to the target point 400, for example. D denotes the vertical distance from the grounding surface of the excavator 3 to the target point 400. H denotes the vertical distance from the grounding surface of the excavator 3 to the position of the body part 31 (e.g., the pivot of the body part 31). Here, D and H each takes a positive value in a direction of a vertical axis Z illustrated in FIG. 4.

Assuming that the values of R, D, and H are defined as described above, a distance L from the body part 31 of the excavator 3 to the target point 400 can be calculated according to the equation below.

$$L=\sqrt{R^2+(D-H)^2} \quad \text{[Math. 1]}$$

The excavation point obtaining section 110 (the excavation region restriction section 111) restricts the excavation possible region to a target point satisfying the following conditions, based on the distance L calculated as described above.

$$D_{min} < D < D_{max} \quad \text{[Math. 2]}$$

$$L_{min} < L < L_{max} \quad \text{[Math. 3]}$$

Note that upper and lower limit values (boundary values) of each of D and L described above may be determined according to the size of the excavator 3, the size of the object 2 (concretely, the soil pit), and the like.

Selection of Excavation Point, Based on Soil Volume

The excavation point obtaining section 110 may determine the excavation point, based on the accumulation volume of the object 2, to obtain the information related to the excavation point.

Concretely, the excavation point obtaining section 110 (the soil volume calculation section 112) calculates the volume of soil, based on an excavation reference point in the excavation region specified by the excavation region restriction section 111, and a bucket passage region. Here, the excavation reference point is a point at which the excavator 3 starts excavation, more specifically, a point at which soil (the object 2) comes into the bucket included in the excavator 3. The bucket passage region is a region where the bucket passes until the bucket is moved a distance corresponding to the dragging width from the excavation reference point (concretely, the point at which the soil comes into the bucket).

Figure 5A:
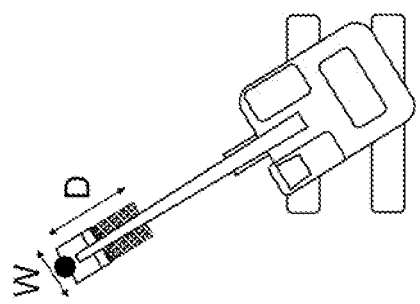
FIGS. 5A and 5B are explanatory diagrams for describing an example of processing for calculating a volume of soil.
Figure 5B:
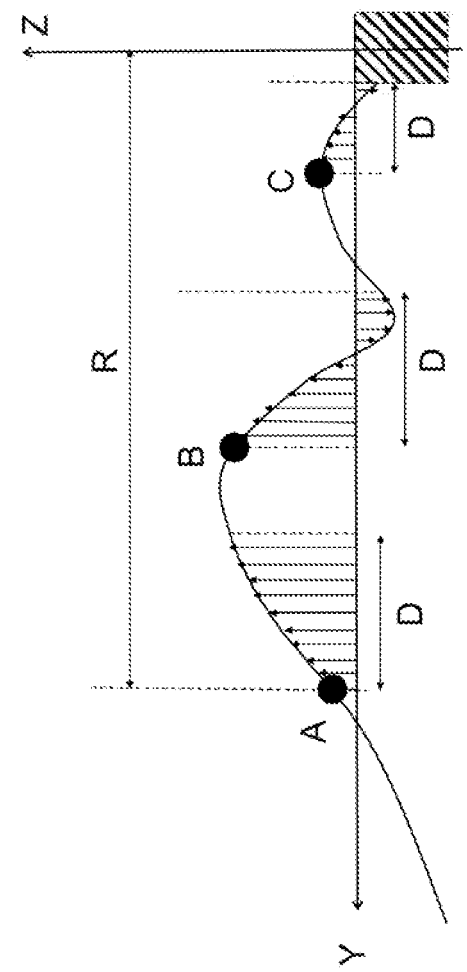

FIGS. 5A and 5B are explanatory diagrams for describing an example of processing for calculating the volume of soil. With reference to FIG. 5A, the bucket passage region may be determined by a value obtained by multiplying the bucket dragging width D and a bucket width W. With reference to FIG. 5B, the soil volume calculation region is determined by the interval corresponding to the bucket dragging width D from each of excavation reference points A, B, and C in the excavation region.

In view of this, in the example illustrated in FIG. 5B, the volume VOL of soil (an accumulation volume of the object 2) to be excavated from the excavation reference point A is calculated according to the equation below.

$$VOL = \int_{R-D}^{R} \int_{-\frac{W}{2}}^{\frac{W}{2}} z(x, y) dx dy \quad \text{[Math. 4]}$$

Here, (x, y) represents horizontal position coordinates. A function $z(x, y)$ is a function expressing the depth of the object from a surface of the soil (the object 2) to the grounding surface of the excavator. The depth expressed by the function $z(x, y)$ is calculated based on the information obtained by the position detection apparatus 5, for example.

In this way, the excavation point obtaining section 110 (the soil volume calculation section 112) can calculate the volume of soil (the accumulation volume of the object 2) for each of the excavation reference points A, B, and C.

Note that, in the example illustrated in FIG. 5B, since there is a soil retaining in a case of excavating the soil (the object 2) from the excavation reference point C, the bucket dragging width D may be restricted according to the size of the soil retaining.

The excavation point obtaining section 110 (the excavation position selection section 113) selects one of the excavation reference points as the excavation point, based on the calculated volume of soil. The excavation point obtaining section 110 (the excavation position selection section 113) selects, as the excavation point, an excavation reference point with the calculated volume of soil being the greatest, for example. For example, in the example illustrated in FIG. 5B, the excavation reference point A is selected as the excavation point. In other words, the excavation reference point A is determined as the excavation point. In this way, the soil (the object 2) can be excavated from the point with a greater volume of soil (the object 2) being accumulated.

Note that the excavation point to be selected is not limited to the above-described excavation reference point with the greatest soil volume, and, for example, a point with the greatest volume of soil being possible to be loaded to the bucket may be determined as the excavation point. In this case, to be able to select, as the excavation point, the point with the greatest volume of soil being possible to be loaded to the bucket, the excavation point obtaining section 110 (the soil volume calculation section 112) calculates the volume of soil possible for the bucket to load in a case of excavation from each excavation reference point. The excavation point obtaining section 110 (the excavation position selection section 113) then selects the excavation reference point with the greatest volume of soil being possible to be loaded to the bucket as the excavation point, based on the calculated soil volume.

(2) Calculation of Parameters

The excavation trajectory generation apparatus 4 (the parameter calculation section 120) includes, for example, a distance calculation section 121, a depth calculation section 122, a gradient calculation section 123, a bucket dragging width calculation section 124, an average gradient calculation section 125, and a parameter determination section 126 as illustrated in FIG. 3.

Definitions of Parameters

Figure 6:
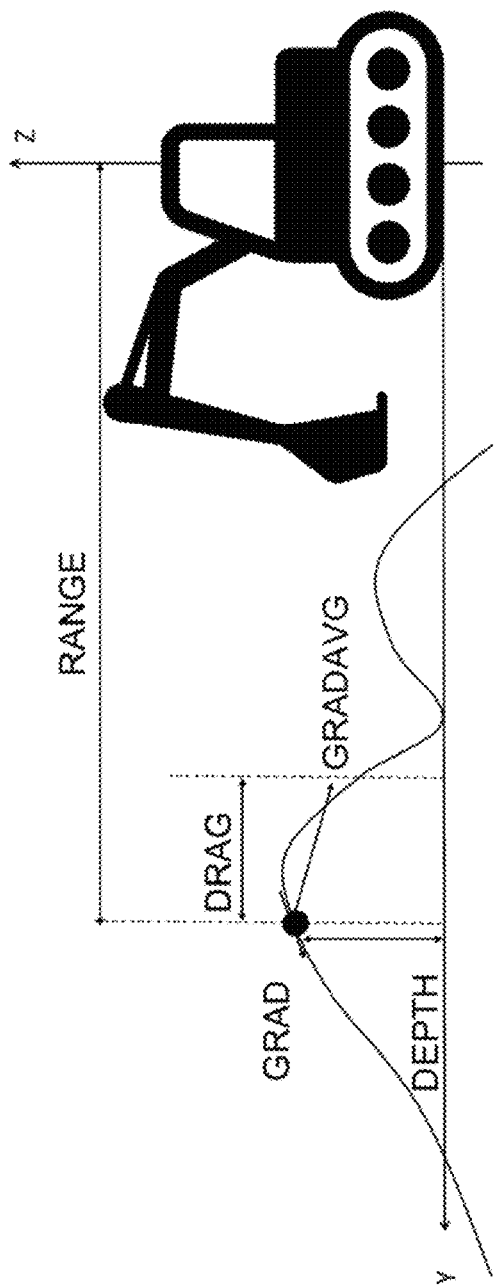
FIG. 6 is a diagram for describing parameters calculated by the excavation trajectory generation apparatus 4 (a parameter calculation section 120)

FIG. 6 is a diagram for describing parameters calculated by the excavation trajectory generation apparatus 4 (the parameter calculation section 120).

RANGE denotes the horizontal distance from the position of the body part (e.g., the pivot Z of the body part) of the excavator 3 to the excavation point, for example. DEPTH denotes the depth of the object 2 at the excavation point. GRAD denotes a gradient at the excavation point. DRAG denotes a bucket dragging width at the time of excavation. GRADavg denotes an average gradient of the excavation region.

For example, RANGE and DEPTH are used to determine a trajectory to the excavation point. GRAD is used to determine a bucket insertion angle at the time of excavation. DRAG is used to determine a bucket passage range at the time of excavation. GRADavg is used to determine the gradient of the excavation trajectory.

Calculation of RANGE

The parameter calculation section 120 (the distance calculation section 121) calculates RANGE. For example, the parameter calculation section 120 (the distance calculation section 121) calculates RANGE, by a relative distance from the position of the body part (e.g., the pivot Z of the body part) of the excavator 3 to the excavation point.

Calculation of DEPTH

The parameter calculation section 120 (the depth calculation section 122) calculates, as DEPTH, the depth of the object from the excavation point to the grounding surface of the excavator, based on a detection result obtained by the position detection apparatus 5, for example.

Calculation of GRAD

Figure 7:
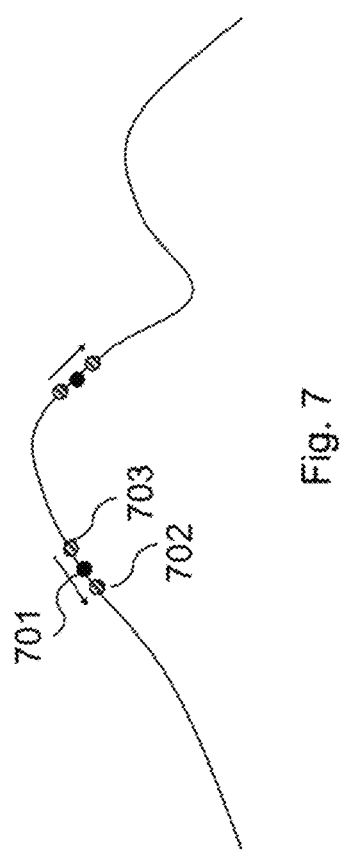
FIG. 7 is a diagram for describing processing for calculating GRAD.

FIG. 7 is a diagram for describing processing for calculating GRAD. The gradient calculation section 123 calculates the gradient at an excavation point 701 as GRAD, based on depth errors for the excavation point 701 and neighboring points 702 and 703, as illustrated in FIG. 7, for example.

Calculation of DRAG and GRADavg

FIG. 8 is a diagram illustrating an example of a calculation algorithm for calculating DRAG and GRADavg. In other words, with reference to FIG. 8, DRAG and GRADavg are calculated according to an algorithm as that illustrated in FIG. 8, for example.

First, the parameter calculation section 120 (the bucket dragging width calculation section 124) determines DRAG to be equal to the minimum bucket dragging width (DRAGmin) that is required in order to excavate a predetermined volume of soil from the determined excavation point. Here, the predetermined volume of soil is obtained by the excavation soil volume obtaining section 130, and the excavation soil volume obtaining section 130 notifies the bucket dragging width calculation section 124 of the predetermined volume of soil, for example.

Figure 9:
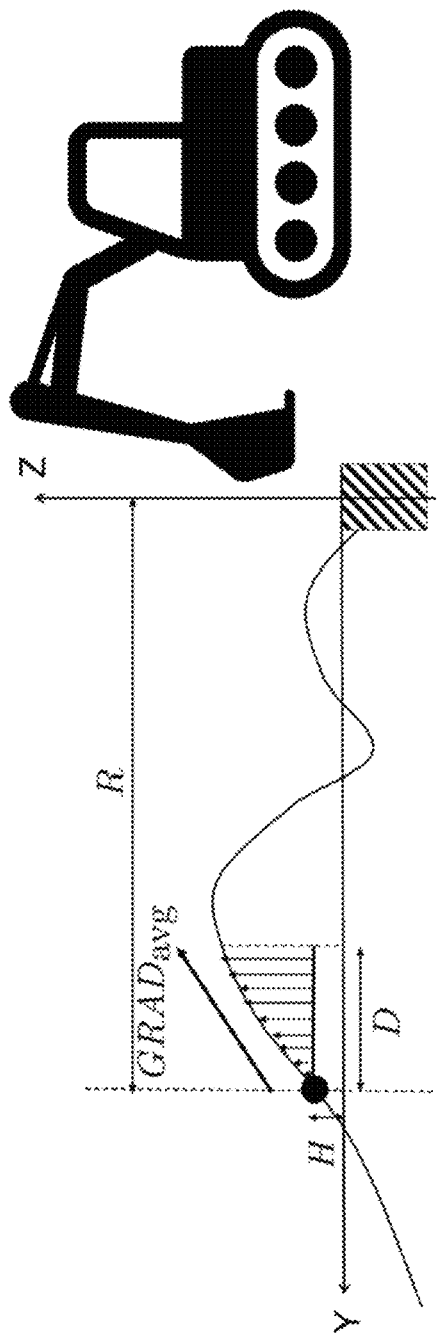
FIG. 9 is a diagram for describing processing for calculating an average gradient GRADavg of an object 2.

Next, the parameter calculation section 120 (the average gradient calculation section 125) calculates the average gradient GRADavg of the object 2 accumulated at the excavation point. For example, the parameter calculation section 120 (the average gradient calculation section 125) calculates the average gradient GRADavg of the object 2 accumulated at the excavation point, based on the depth of the object 2, the excavation point, and the bucket dragging width DRAG (the excavation possible range). FIG. 9 is a diagram for describing processing for calculating the average gradient GRADavg of the object 2. With reference to FIG. 9, the average gradient GRADavg is calculated by dividing an integral value of the depth of the object 2 in the excavation region by the bucket dragging width D as expressed by the following equation.

$$GRAD_{avg} = \frac{1}{D}\int_{R-D}^{R}(z(y) - H)dy \qquad \text{[Math. 5]}$$

Here, H denotes the height from the grounding surface of the excavator 3 to the excavation point. DRAG calculated by the bucket dragging width calculation section 124 is input to the bucket dragging width D.

Figure 10:
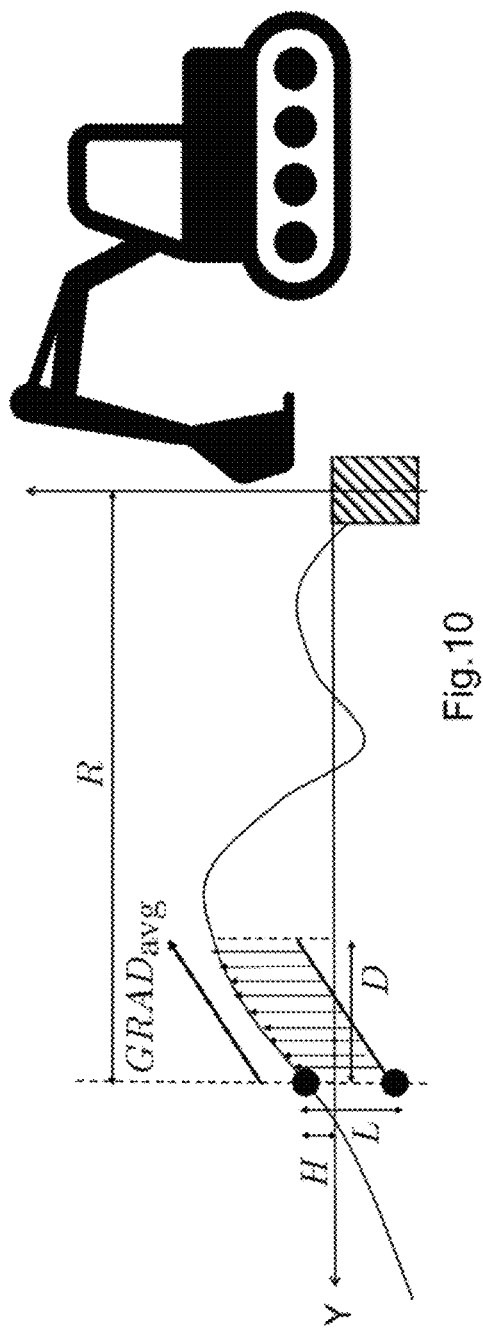
FIG. 10 is an explanatory diagram for describing processing for calculating a volume VOL of soil to be excavated, the volume VOL being estimated from DRAG and GRADavg.

Subsequently, the parameter calculation section 120 (the parameter determination section 126) calculates the volume VOL of soil to be excavated, the VOL being expected from DRAG and GRADavg calculated as described above. FIG. 10 is an explanatory diagram for describing processing for calculating the volume VOL of soil to be excavated estimated from DRAG and GRADavg. Concretely, by using the following equation, the parameter calculation section 120 (the parameter determination section 126) calculates the volume VOL of soil on a baseline having a gradient of GRADavg with the excavation point as a starting point.

$$VOL = \int_{R-D}^{R}\int_{-\frac{W}{2}}^{\frac{W}{2}}[z(x, y) - (H - L + GRAD_{avg} \cdot (R - y))]dxdy \qquad \text{[Math. 6]}$$

Here, H denotes the height from the grounding surface of the excavator 3 to the excavation point. L denotes the depth for the bucket to be inserted from the excavation point, i.e., a bucket length. DRAG calculated by the bucket dragging width calculation section 124 is input to D. R denotes a distance in an estimated direction from the pivot Z of the excavator 3 to the target point. W denotes a bucket width. A function z(x, y) is a function expressing the depth of the object from a surface of the soil (the object 2) to the grounding surface of the excavator. The depth expressed by the function z(x, y) is calculated based on the information obtained by the position detection apparatus 5, for example.

The parameter calculation section 120 (the parameter determination section 126) determines whether VOL calculated according to the equation exceeds a predetermined cubic volume VOLth of soil that is loadable, based on a bucket capacity. In a case that VOL exceeds the desired cubic volume VOLth of soil, current DRAG and GRADavg are sent to the excavation trajectory generation section 140.

In contrast, in a case that VOL does not exceed the predetermined cubic volume VOLth of soil, the parameter calculation section 120 (the bucket dragging width calculation section 124) updates the current bucket dragging width DRAG (a minimum bucket dragging width DRAGmin) to DRAG+ΔDRAG and determines whether DRAG after the update exceeds the maximum bucket dragging width DRAGmax. In a case that DRAG after the update exceeds the maximum bucket dragging width DRAGmax, current DRAG and GRADavg are sent to the excavation trajectory generation section 140. In contrast, in a case that DRAG after the update does not exceed the maximum bucket dragging width DRAGmax, the parameter calculation section 120 (the average gradient calculation section 125) recalculates GRADavg, based on DRAG after the update.

SUMMARY

As described above, the parameter calculation section 120 calculates RANGE, DEPTH, GRAD, DRAG, and GRADavg and notifies the excavation trajectory generation section 140 of the five parameters thus calculated.

(3) Generation of Excavation Trajectory

The excavation trajectory generation apparatus 4 (the excavation trajectory generation section 140) generates a trajectory with which the excavator 3 excavates the object 2, based on the parameters received from the parameter calculation section 120. Concretely, the excavation trajectory generation apparatus 4 (the excavation trajectory generation section 140) generates the trajectory, based on the depth of the object 2 at the excavation point, the excavation possible range (the bucket dragging width) of the excavator 3, the distance from the excavator 3 to the excavation point, and the gradient of the object 2 accumulated at the excavation point.

Figure 11:
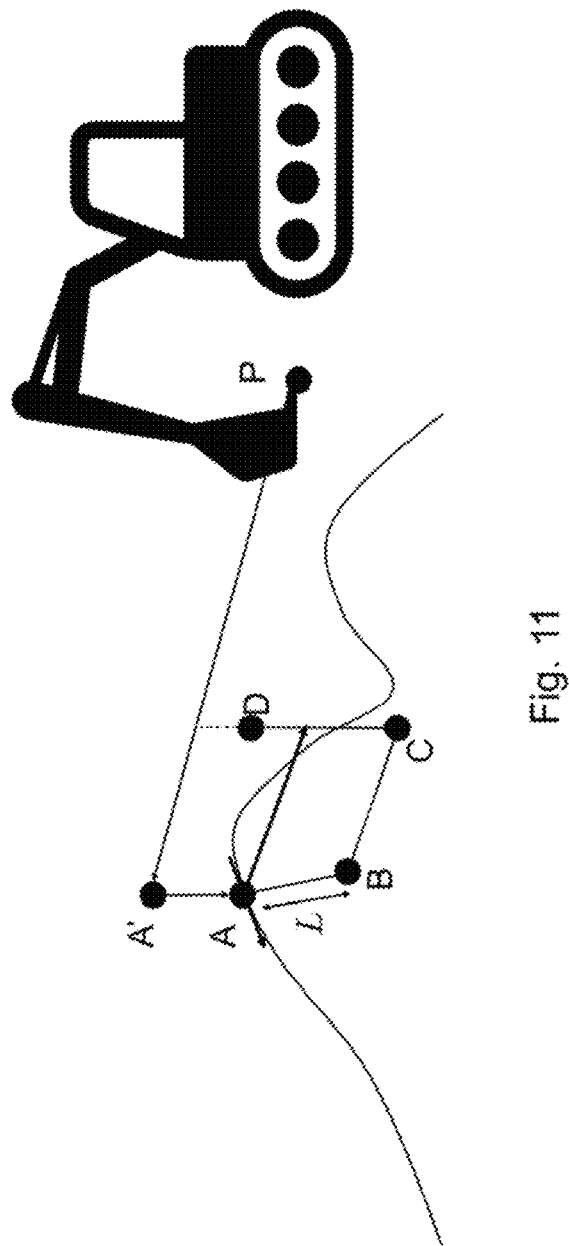
FIG. 11 is an explanatory diagram for describing processing for generating an excavation trajectory according to an excavation trajectory generation algorithm.

For example, the excavation trajectory generation section 140 generates an excavation trajectory according to an excavation trajectory generation algorithm as described below. FIG. 11 is an explanatory diagram for describing processing for generating an excavation trajectory according to the excavation trajectory generation algorithm.

First, the excavation trajectory generation section 140 calculates an upper point A' of the excavation point A, based on the distance RANGE and the depth DEPTH and calculates a straight route from an initial posture P to A'. The excavation trajectory generation section 140 then calculates a straight route from the point A' to the point A. The excavation trajectory generation section 140 then calculates a point B for the bucket to be inserted to a depth L in a direction perpendicular to the gradient GRAD at the point A and calculates a straight route from A to B. The excavation trajectory generation section 140 then calculates a point C separate from the point B by a length of the dragging width DRAG on a straight line inclined by the average gradient GRADavg, and calculates a straight route from B to C. The excavation trajectory generation section 140 then calculates an upper point D of the point C and calculates a straight route from C to D. In this way, the excavation trajectory generation section 140 can generate an excavation trajectory linking, with straight lines, A', A, B, C, and D in this order.

(4) Control Based on Excavation Trajectory

The excavation trajectory generation apparatus 4 (the control section 150) indicates, to the excavator 3, that the excavator 3 excavates the object 2 along the excavation trajectory generated by the excavation trajectory generation section 140.

(5) Display of Excavation Trajectory

Figure 12:
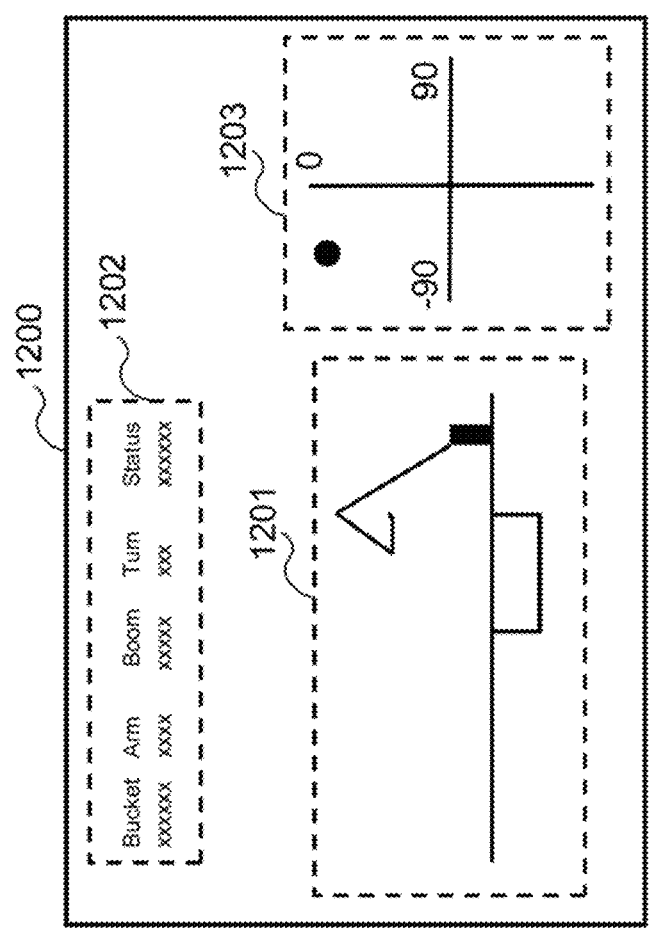
FIG. 12 is a diagram illustrating a screen example of an excavation trajectory displayed on a display apparatus 46.

The excavation trajectory generation apparatus 4 (the display section 160) displays the excavation trajectory generated by the excavation trajectory generation section 140, on the display apparatus 46. FIG. 12 is a diagram illustrating a screen example 1200 of the excavation trajectory displayed on the display apparatus 46. For example, the screen example 1200 illustrated in FIG. 12 mainly includes three display regions 1201, 1202, and 1203.

As illustrated in FIG. 12, the display apparatus 46 displays behavior of the excavator 3 changing according to the excavation trajectory (a display region 1201), for example. For example, the display apparatus 46 may indicate the positions of an excavation site and the excavator 3 and an excavation state, for example. For example, the display apparatus 46 may arrange a plurality of images to display the behavior of the excavator 3 changing according to the excavation trajectory, or may display a plurality of images consecutively to display the behavior of the excavator 3 like a video. For example, the display apparatus 46 may display a trajectory of the excavator 3 generated by the excavation trajectory generation section 140.

The display apparatus 46 displays the numeric values of various state parameters changing according to the excavation trajectory and information related to behavior of the bucket, the boom, the arm, and the like according to the excavation trajectory, for example (the display region 1202). Concretely, for example, the display apparatus 46 displays Bucket (e.g., the angle formed by the line segment between bucket and bucket knife edge axes and the line segment between bucket and arm axes), Arm (e.g., the angle formed by the line segment between the bucket and the arm axes and the line segment between arm and boom axes), Boom (e.g., the angle formed by the line segment between the arm and boom axes and a horizontal line), Turn (e.g., the turning angle having a front face of the excavator 3 at 0 degrees), and Status (e.g., an operation stage such as excavation, loading, turning, or leveling).

The display apparatus 46 may display the positions of the excavator 3 and the object 2 by way of coordinates or a drawing (a display region 1203), for example. Concretely, the display apparatus 46 may display the turning angle of the excavator 3 with a predetermined reference direction of the excavator 3 (e.g., the front face direction of the excavator 3 at the time of starting excavation) being a reference angle (e.g., 0 degrees).

The display apparatus 46 may display information of the object 2, based on the information detected by the position detection apparatus 5, for example. Concretely, for example, the display apparatus 46 may display the relative distance from the excavator 3 to the object 2, the coordinates indicating the position of the object 2, the shape of the object 2 accumulated, the shape being calculated based on the information obtained by the position detection apparatus 5, and the like.

(6) Flow of Processing

Figure 13:
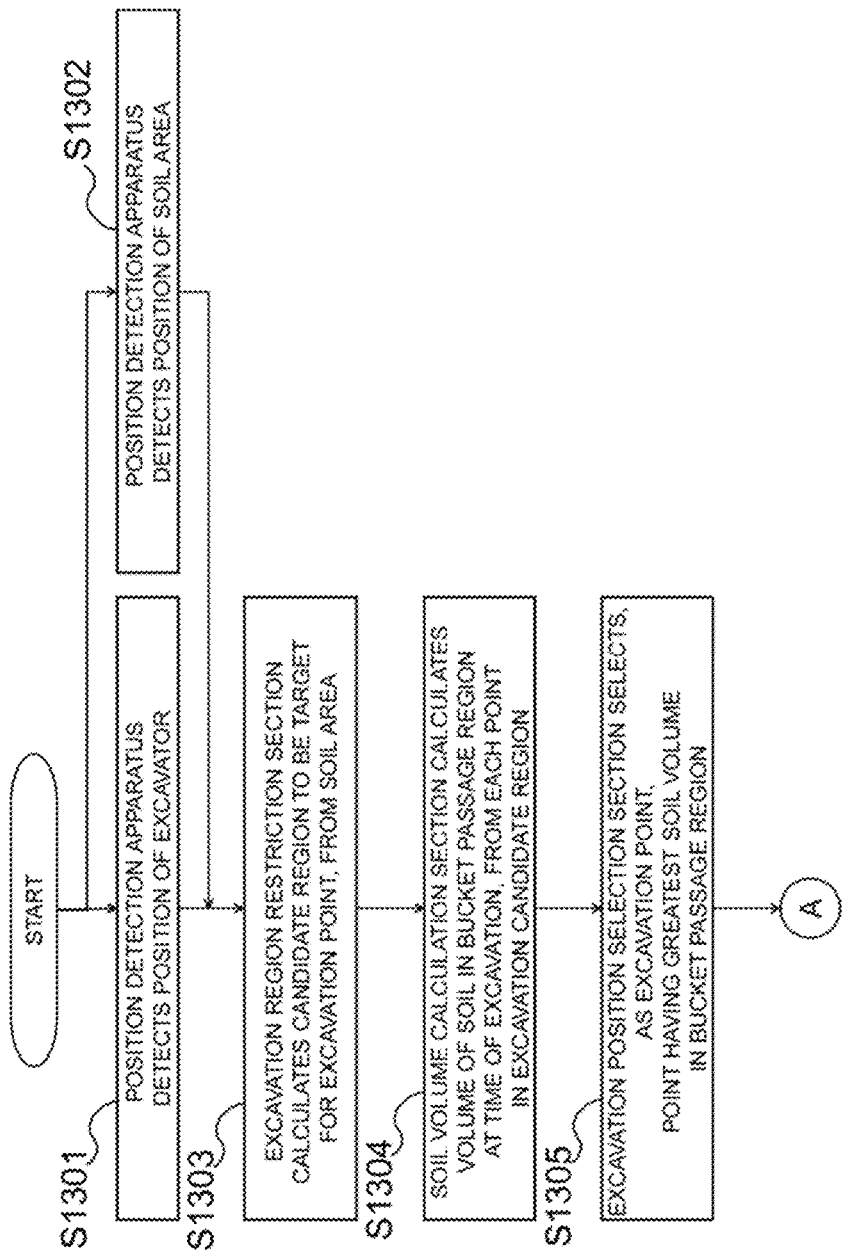
FIG. 13 is a flowchart for describing an example of a schematic flow of excavation trajectory generation processing according to the first example embodiment.
Figure 14:
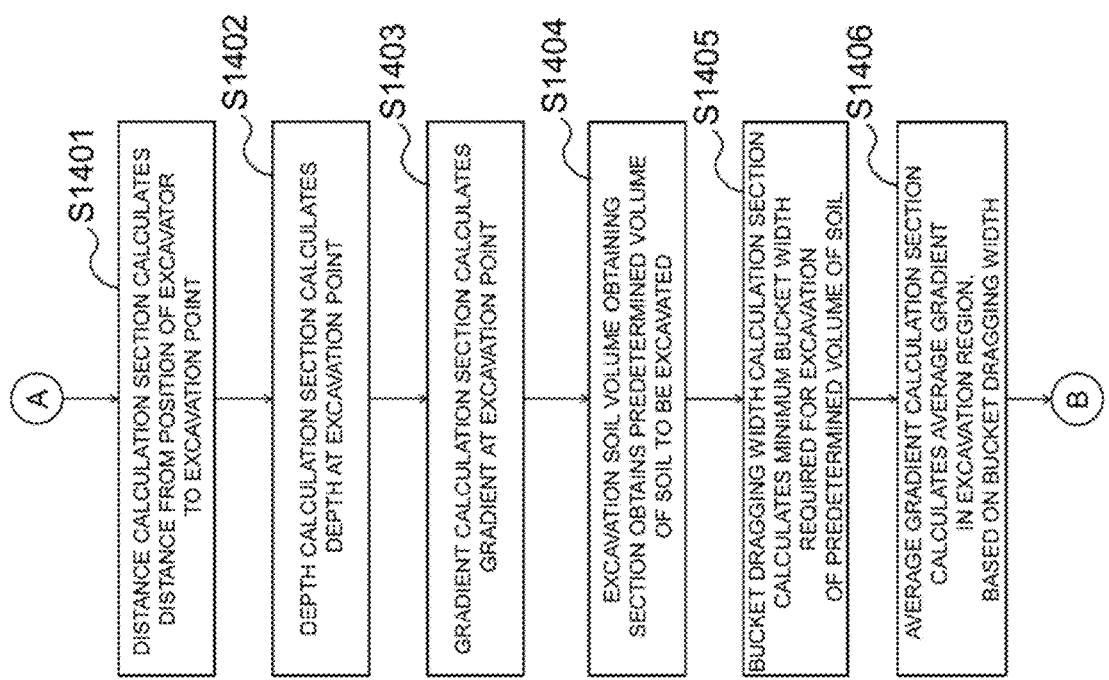
FIG. 14 is a flowchart for describing an example of a schematic flow of excavation trajectory generation processing according to the first example embodiment.
Figure 15:
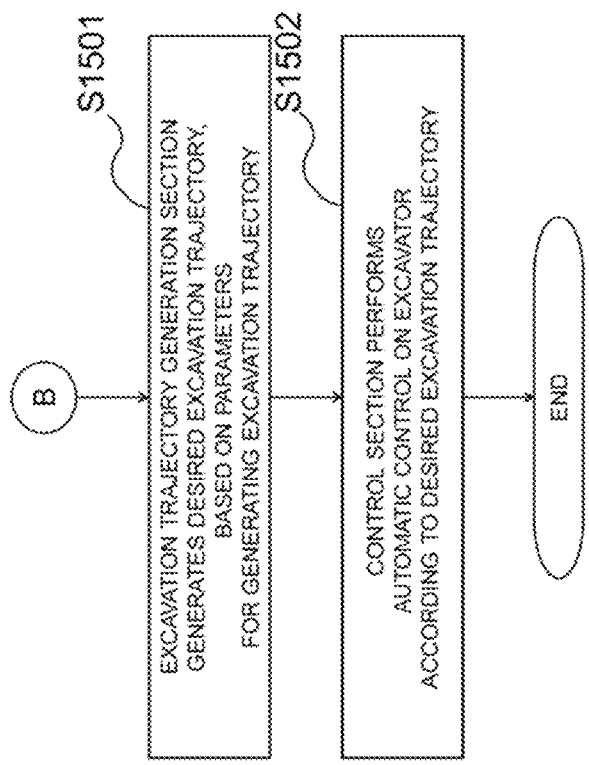
FIG. 15 is a flowchart for describing an example of a schematic flow of excavation trajectory generation processing according to the first example embodiment.

With reference to FIGS. 13 to 15, an example of processing for generating an excavation trajectory according to the first example embodiment will be described. FIGS. 13, 14, and 15 are flowcharts for describing an example of a schematic flow of excavation trajectory generation processing according to the first example embodiment.

In step S1301, the position detection apparatus 5 detects the position of the excavator 3 (e.g., the position of the pivot). In step S1302, the position detection apparatus 5 detects the position of a soil area (e.g., the object 2). Then, the processing advances to Step S1303. Note that the position of the excavator 3 may be detected by the excavator 3 itself using a positioning system such as the Global Positioning System (GPS) or the Global Navigation Satellite System (GNSS). The position of the soil area (the object 2) may be identified in advance without being limited to a case that the position is detected by the position detection apparatus 5.

In step S1303, the excavation trajectory generation apparatus 4 (the excavation region restriction section 111) calculates a candidate region to be a target for an excavation point from the soil area (the region where the object 2 is accumulated), and the processing advances to step S1304.

In step S1304, the excavation trajectory generation apparatus 4 (the soil volume calculation section 112) calculates the volume of soil in a bucket passage region at the time of excavation from each point in the excavation candidate region, and the processing advances to step S1305.

In step S1305, the excavation trajectory generation apparatus 4 (the excavation position selection section 113) selects, as the excavation point, a point having the greatest volume of soil in the bucket passage region, and the processing advances to step S1401 illustrated in FIG. 14.

In step S1401, the excavation trajectory generation apparatus 4 (the distance calculation apparatus 121) calculates the distance from the position of the excavator 3 (e.g., the position of the pivot) to the excavation point, and the processing advances to step S1402.

In step S1402, the excavation trajectory generation apparatus 4 (the depth calculation section 122) calculates the depth of the excavation point, and the processing advances to step S1403.

In step S1403, the excavation trajectory generation apparatus 4 (the gradient calculation section 123) calculates the gradient at the excavation point, and the processing advances to step S1404.

In step S1404, the excavation trajectory generation apparatus 4 (the excavation soil volume obtaining section 130) obtains a predetermined volume of soil to be excavated, the predetermined volume being set according to an operation input by an operator, for example, and the processing advances to step S1405.

In step S1405, the excavation trajectory generation apparatus 4 (the bucket dragging width calculation section 124)

calculates the minimum bucket dragging width required in order to excavate the predetermined volume of soil to be excavated, and the processing advances to step S1406.

In step S1406, the excavation trajectory generation apparatus 4 (the average gradient calculation section 125) calculates the average gradient in the excavation region based on the bucket dragging width, and the processing advances to step S1501 illustrated in FIG. 15.

In step S1501, the excavation trajectory generation apparatus 4 (the excavation trajectory generation section 140) generates a desired excavation trajectory, based on the parameters for generating an excavation trajectory, the parameters being calculated in steps S1401 to S1406, and the processing advances to step S1502.

In step S1502, the excavation trajectory generation apparatus 4 (the control section 150) automatically controls the excavator so as to follow the desired excavation trajectory, and the processing illustrated in FIGS. 13 to 15 is terminated.

Through the processing illustrated in FIGS. 13 to 15, it is possible to generate a trajectory that enables efficient excavation so that an appropriate volume of soil can be excavated, for example, in consideration of an accumulation state of an excavation object such as the accumulation volume and the shape of soil (the object 2) accumulated to a soil pit.

4. Second Example Embodiment

Next, with reference to FIG. 16, a second example embodiment of the present invention will be described. The above-described first example embodiment is a concrete example embodiment, whereas the second example embodiment is a more generalized example embodiment.

<4.1. Configuration of Excavation Trajectory Generation Apparatus 4>

Figure 16:
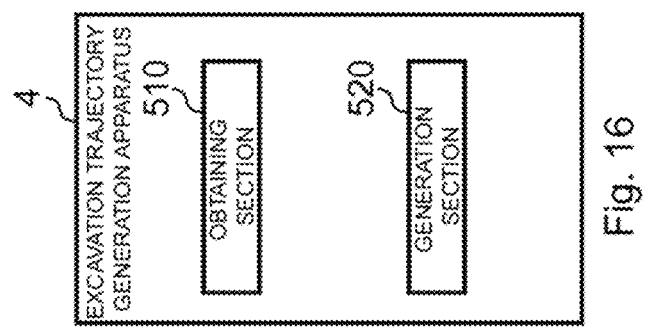
FIG. 16 is a block diagram illustrating an example of a schematic configuration of an excavation trajectory generation apparatus 4 according to a second example embodiment.

FIG. 16 is a block diagram illustrating an example of a schematic configuration of an excavation trajectory generation apparatus 4 according to the second example embodiment. With reference to FIG. 16, the excavation trajectory generation apparatus 4 includes an obtaining section 510 and a generation section 520.

The obtaining section 510 and the generation section 520 may be implemented with one or more processors, and a memory (e.g., a nonvolatile memory and/or a volatile memory) and/or a hard disk. The obtaining section 510 and the generation section 520 may be implemented with the same processor or may be implemented with separate processors. The memory may be included in the one or more processors or may be provided outside the one or more processors.

<4.2. Technical Features>

Technical features of the second example embodiment will be described.

According to the second example embodiment, the excavation trajectory generation apparatus 4 (the obtaining section 510) obtains information related to an excavation point at which the object is to be excavated. The excavation trajectory generation apparatus 4 (the generation section 520) then generates a trajectory with which the excavator excavates the object, based on the excavation point, accumulation height information for the object at the excavation point, and an excavation possible range for the excavator to excavate the object.

Relationship with First Example Embodiment

As an example, the obtaining section 510 and the generation section 520 of the second example embodiment may perform operations of the excavation point obtaining section 110 and the excavation trajectory generation section 140 of the first example embodiment, respectively. In this case, the descriptions of the first example embodiment may be applicable to the second example embodiment.

Note that the second example embodiment is not limited to this example.

The second example embodiment has been described above. According to the second example embodiment, it is possible, for example, to generate a trajectory that enables efficient excavation of an object.

5. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the excavation trajectory generation apparatus described above may be provided, for example, in an excavator, without being limited to a case that the excavation trajectory generation apparatus is arranged remotely from an excavator. The steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements (e.g., the excavation point obtaining section, the parameter calculation section, and/or the excavation trajectory generation section) of the excavation trajectory generation apparatus described in the Specification (e.g., one or more apparatuses (or units) among a plurality of apparatuses (or units) constituting the excavation trajectory generation apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A method for generating an excavation trajectory, the method comprising:

obtaining information related to an excavation point at which an object is to be excavated; and generating a trajectory with which an excavator excavates the object, based on the excavation point, accumulation height information for the object at the excavation point, and an excavation possible range for the excavator to excavate the object.

(Supplementary Note 2)

The method for generating an excavation trajectory according to supplementary note 1, wherein in the obtaining of the information related to the excavation point, the excavation point is determined based on an accumulation volume of the object.

(Supplementary Note 3)

The method for generating an excavation trajectory according to supplementary note 1 or 2, further comprising
indicating, to the excavator, that the excavator excavates the object along the trajectory.

(Supplementary Note 4)

The method for generating an excavation trajectory according to any one of supplementary notes 1 to 3, wherein in the generating of the trajectory, the trajectory is generated based on the accumulation height information for the object, the excavation possible range for the excavator, a distance from the excavator to the excavation point, and a gradient of the object accumulated at the excavation point.

(Supplementary Note 5)

The method for generating an excavation trajectory according to any one of supplementary notes 1 to 4, wherein the accumulation height information for the object is information expressed by a depth of the object from the excavation point to a grounding surface of the excavator.

(Supplementary Note 6)

The method for generating an excavation trajectory according to supplementary note 5, further comprising
calculating the depth of the object, based on a detection result obtained by a position detection apparatus that detects a position of the object.

(Supplementary Note 7)

The method for generating an excavation trajectory according to any one of supplementary notes 1 to 6, further comprising
displaying the trajectory on a display apparatus.

(Supplementary Note 8)

The method for generating an excavation trajectory according to any one of supplementary notes 1 to 7, further comprising
calculating an average gradient of the object accumulated at the excavation point, based on the accumulation height information for the object, the excavation point, and the excavation possible range for the excavator, wherein
in the generating of the trajectory, the trajectory is generated based on the accumulation height information for the object, the excavation possible range for the excavator, and the average gradient of the object.

(Supplementary Note 9)

A system comprising:
an excavator configured to excavate an object; and
an excavation trajectory generation apparatus configured to generate a trajectory with which the excavator excavates the object, wherein
the excavation trajectory generation apparatus includes
an obtaining section configured to obtain information related to an excavation point at which the object is to be excavated,
a generation section configured to generate a trajectory with which the excavator excavates the object, based on the excavation point, accumulation height information for the object at the excavation point, and an excavation possible range for the excavator, and
a control section configured to indicate, to the excavator, that the excavator excavates the object along the trajectory, and
the excavator is configured to excavate the object along the trajectory.

(Supplementary Note 10)

The system according to supplementary note 9, wherein the obtaining section is configured to determine the excavation point, based on an accumulation volume of the object, to obtain the information related to the excavation point.

(Supplementary Note 11)

The system according to supplementary note 9 or 10, wherein the generation section is configured to generate the trajectory, based on the accumulation height information for the object, the excavation possible range for the excavator, a distance from the excavator to the excavation point, and a gradient of the object accumulated at the excavation point.

(Supplementary Note 12)

The system according to any one of supplementary notes 9 to 11, wherein the accumulation height information for the object is information expressed by a depth of the object from the excavation point to a grounding surface of the excavator.

(Supplementary Note 13)

The system according to supplementary note 12, further comprising
a position detection apparatus configured to detect a position of the object, wherein
the excavation trajectory generation apparatus further includes
a depth calculation section configured to calculate the depth of the object, based on a detection result obtained by the position detection apparatus.

(Supplementary Note 14)

The system according to any one of supplementary notes 9 to 13, further comprising
a display apparatus configured to display the trajectory.

(Supplementary Note 15)

The system according to any one of supplementary notes 9 to 14, wherein
the excavation trajectory generation apparatus further includes
a calculation section configured to calculate an average gradient of the object accumulated at the excavation point, based on the accumulation height information for the object, the excavation point, and the excavation possible range for the excavator, and
the generation section is configured to generate the trajectory, based on the accumulation height information for the object, the excavation possible range for the excavator, and the average gradient of the object.

(Supplementary Note 16)

An excavation trajectory generation apparatus comprising:
an obtaining section configured to obtain information related to an excavation point at which an object is to be excavated; and
a generation section configured to generate a trajectory with which an excavator excavates the object, based on the excavation point, accumulation height information for the object at the excavation point, and an excavation possible range for the excavator to excavate the object.

(Supplementary Note 17)

The excavation trajectory generation apparatus according to supplementary note 16, wherein the obtaining section is configured to determine the excavation point, based on an accumulation volume of the object, to obtain the information related to the excavation point.

(Supplementary Note 18)

The excavation trajectory generation apparatus according to supplementary note 16 or 17, further comprising
a control section configured to indicate, to the excavator, that the excavator excavates the object along the trajectory.

(Supplementary Note 19)

The excavation trajectory generation apparatus according to any one of supplementary notes 16 to 18, wherein the generation section is configured to generate the trajectory, based on the accumulation height information for the object, the excavation possible range for the excavator, a distance from the excavator to the excavation point, and a gradient of the object accumulated at the excavation point.

(Supplementary Note 20)

The excavation trajectory generation apparatus according to any one of supplementary notes 16 to 19, wherein the accumulation height information for the object is information expressed by a depth of the object from the excavation point to a grounding surface of the excavator.

(Supplementary Note 21)

The excavation trajectory generation apparatus according to supplementary note 20, further comprising
a depth calculation section configured to calculate the depth of the object, based on a detection result obtained by a position detection apparatus configured to detect a position of the object.

(Supplementary Note 22)

The excavation trajectory generation apparatus according to any one of supplementary notes 16 to 21, further comprising
a display section configured to display the trajectory on a display apparatus.

(Supplementary Note 23)

The excavation trajectory generation apparatus according to any one of supplementary notes 16 to 22, further comprising
an average gradient calculation section configured to calculate an average gradient of the object accumulated at the excavation point, based on the accumulation height information for the object, the excavation point, and the excavation possible range for the excavator, wherein
the generation section is configured to generate the trajectory, based on the accumulation height information for the object, the excavation possible range for the excavator, and the average gradient of the object.

INDUSTRIAL APPLICABILITY

It is possible to generate a trajectory that enables efficient excavation of an object in a system in which an excavator excavates an object such as soil.

REFERENCE SIGNS LIST

1 System
2 Object
3 Excavator
4 Excavation Trajectory Generation Apparatus
5 Position Detection Apparatus
6 Network
110 Excavation Point Obtaining Section
120 Parameter Calculation Section
130 Excavation Soil Volume Obtaining Section
140 Excavation Trajectory Generation Section
150 Control Section
160 Display Section
510 Obtaining Section
520 Generation Section

What is claimed is:

1. A method for generating an excavation trajectory, the method comprising:
obtaining information related to an excavation point at which an object is to be excavated;
receiving a detection result indicating a detected position of the object;
calculating the depth of the object based on the detection result;
generating a trajectory with which an excavator excavates the object, based on the excavation point, accumulation height information for the object at the excavation point, and a range in which the excavator can excavate the object, the accumulation height information is expressed by the depth of the object from the excavation point to a grounding surface of the excavator;
calculating an average gradient of the object accumulated at the excavation point, based on the accumulation height information for the object, the excavation point, and the range for the excavator; and
controlling the excavator to excavate the object based on the trajectory, wherein
in the generating of the trajectory, the trajectory is generated based on the accumulation height information for the object, the range in which the excavator can excavate the object for the excavator, and the average gradient of the object.

2. The method for generating an excavation trajectory according to claim 1, wherein in the obtaining of the information related to the excavation point, the excavation point is determined based on an accumulation volume of the object.

3. The method for generating an excavation trajectory according to claim 1, further comprising
indicating, to the excavator, that the excavator excavates the object along the trajectory.

4. The method for generating an excavation trajectory according to claim 1, wherein in the generating of the trajectory, the trajectory is generated based on the accumulation height information for the object, the range for the excavator, a distance from the excavator to the excavation point, and a gradient of the object accumulated at the excavation point.

5. The method for generating an excavation trajectory according to claim 1, further comprising
displaying the trajectory.

6. A system comprising:
a memory storing instructions;
one or more processors configured to execute the instructions to:
obtain information related to an excavation point at which an object is to be excavated,
receive a detection result indicating a detected position of the object,
calculate the depth of the object based on the detection result,
generate a trajectory with which an excavator excavates the object, based on the excavation point, accumulation height information for the object at the excavation point, and a range in which the excavator can excavate the object, the accumulation height information is expressed by the depth of the object from the excavation point to a grounding surface of the excavator, indicate, to the excavator, that the excavator excavates the object along the trajectory, calculating an average gradient of the object accumulated at the excavation point, based on the accumulation height information for the object, the excavation point, and the range for the excavator; and control the excavator to excavate the object based on the trajectory, wherein the excavator is configured to excavate the object along the trajectory, and in the generating of the trajectory, the trajectory is generated based on the accumulation height information for the object, the range in which the excavator can excavate the object for the excavator, and the average gradient of the object.

7. The system according to claim 6, wherein the one or more processors is configured to execute the instructions to determine the excavation point, based on an accumulation volume of the object, to obtain the information related to the excavation point.

8. The system according to claim 6, wherein the one or more processors is configured to execute the instructions to generate the trajectory, based on the accumulation height information for the object, the range for the excavator, a distance from the excavator to the excavation point, and a gradient of the object accumulated at the excavation point.

9. The system according to claim 6, wherein the one or more processors are further configured to execute the instructions to display the trajectory.

10. The system according to claim 6, wherein
the one or more processors is further configured to execute the instructions to
calculate an average gradient of the object accumulated at the excavation point, based on the accumulation height information for the object, the excavation point, and the range for the excavator, and
the one or more processors is configured to execute the instructions to generate the trajectory, based on the accumulation height information for the object, the range for the excavator, and the average gradient of the object.

11. An excavation trajectory generation apparatus comprising:
a memory storing instructions; and
one or more processors configured to execute the instructions to:
obtain information related to an excavation point at which an object is to be excavated;
receive a detection result indicating a detected position of the object;
calculate the depth of the object based on the detection result;
generate a trajectory with which an excavator excavates the object, based on the excavation point, accumulation height information for the object at the excavation point, and a range in which the excavator can excavate the object;
calculate an average gradient of the object accumulated at the excavation point, based on the accumulation height information for the object, the excavation point, and the range for the excavator; and
control the excavator to excavate the object based on the trajectory, wherein
in the generating of the trajectory, the trajectory is generated based on the accumulation height information for the object, the range for the excavator, and the average gradient of the object.

12. The excavation trajectory generation apparatus according to claim 11, wherein the one or more processors is configured to execute the instructions to determine the excavation point, based on an accumulation volume of the object, to obtain the information related to the excavation point.

13. The excavation trajectory generation apparatus according to claim 11, wherein the one or more processors is further configured to execute the instructions to indicate, to the excavator, that the excavator excavates the object along the trajectory.

14. The excavation trajectory generation apparatus according to claim 11, wherein the one or more processors is configured to execute the instructions to generate the trajectory, based on the accumulation height information for the object, the range for the excavator, a distance from the excavator to the excavation point, and a gradient of the object accumulated at the excavation point.

* * * * *